United States Patent
Kim (10) Patent No.: US 7,972,185 B2
(45) Date of Patent: Jul. 5, 2011

(54) BATTERY MODULE HAVING CONNECTOR FOR CONNECTING TERMINALS

(75) Inventor: Yong-Sam Kim, Suwon-si (KR)

(73) Assignee: SB LiMotive Co., Ltd., Yongin-si (KR)

( * ) Notice: Subject to any disclaimer, the term of this patent is extended or adjusted under 35 U.S.C. 154(b) by 0 days.

(21) Appl. No.: 12/625,519

(22) Filed: Nov. 24, 2009

(65) Prior Publication Data
US 2010/0233915 A1    Sep. 16, 2010

Related U.S. Application Data

(60) Provisional application No. 61/160,604, filed on Mar. 16, 2009.

(51) Int. Cl.
*H01R 4/28* (2006.01)
(52) U.S. Cl. ........................................ 439/754
(58) Field of Classification Search .................. 439/754, 439/500, 627, 388
See application file for complete search history.

(56) References Cited

U.S. PATENT DOCUMENTS

| | | | |
|---|---|---|---|
| 3,663,927 A | 5/1972 | Bruner | |
| 2006/0094289 A1* | 5/2006 | Kim et al. | 439/500 |
| 2006/0115727 A1* | 6/2006 | Kim et al. | 429/181 |

FOREIGN PATENT DOCUMENTS

JP    2003-249207    9/2003

OTHER PUBLICATIONS

European Search Report dated May 3, 2010, for corresponding European Patent application 10153141.6, noting listed references in this IDS.
European Communication dated Apr. 20, 2011, for corresponding European Patent application 10153141.6, noting references previously submitted in an IDS dated Jul. 21, 2010.

* cited by examiner

*Primary Examiner* — Edwin A. Leon
*Assistant Examiner* — Vanessa Girardi
(74) *Attorney, Agent, or Firm* — Christie, Parker & Hale, LLP (57) ABSTRACT

A battery module includes a plurality of unit batteries each having a terminal electrically connected to a terminal base. The battery module further includes at least one connector including at least one protrusion on a side facing the terminal base of the terminal to electrically couple the terminal of one of the plurality of unit batteries with the terminal of a neighboring one of the plurality of unit batteries. The at least one protrusion may include at least one first protrusion and at least one second protrusion. The at least one first protrusion contacts the terminal base of the one of the plurality of unit batteries and the at least one second protrusion contacts the terminal base of the neighboring one of the plurality of unit batteries.

18 Claims, 7 Drawing Sheets

BATTERY MODULE HAVING CONNECTOR FOR CONNECTING TERMINALS

CROSS-REFERENCE TO RELATED APPLICATION

This application claims priority to and the benefit of U.S. Provisional Patent Application No. 61/160,604, filed Mar. 16, 2009, the entire content of which is incorporated herein by reference.

BACKGROUND OF THE INVENTION

1. Field of the Invention

The present invention relates to a battery module.

2. Description of the Related Art

A rechargeable battery can be repeatedly charged and discharged unlike a primary battery which cannot be recharged. A low-capacity rechargeable battery is used for small electronic devices which are portable, such as mobile phones, laptop computer, and camcorders. A large-capacity battery is used as a power source for driving motors, such as for hybrid electric vehicles.

In recent years, a high-power rechargeable battery using a non-aqueous electrolyte having a high energy density is being developed. The high-power rechargeable battery includes a battery module in which a plurality of rechargeable batteries is coupled in series so that the high-power rechargeable battery can be used to drive the motors of devices requiring high power, such as electric vehicles.

Further, a battery module generally includes a plurality of rechargeable batteries coupled in series (each hereinafter referred to as a 'unit battery,' for convenience of description), and each of the rechargeable batteries may have a cylindrical or square shape.

Each of the unit batteries includes a casing, having an electrode assembly placed with a separator between a positive electrode and a negative electrode, and space where the electrode assembly is placed, a cap assembly configured to close and seal the casing, and electrode terminals electrically connected to the electrode assembly and configured to externally protrude through the cap assembly.

Furthermore, the positive and negative terminals of each of the unit batteries are arranged to cross the positive and negative terminals of a neighbor unit battery so that the unit batteries can be coupled to each other in series. A connection member is inserted between the positive terminal of a unit battery on one side and the negative terminal of a neighbor unit battery, and nuts placed over the connection member are engaged with the positive terminal and the negative terminal. Accordingly, the unit batteries are coupled in series via the connection member.

To this end, holes are formed in the connection member into which the positive terminal and the negative terminal are inserted, and outer circumferential surfaces of the positive and negative terminals are processed to have a screw shape for engagement with the nuts.

However, high contact resistance is generated at a surface where the nuts come into contact with the connection member.

This phenomenon is caused by a small contact area between the nuts and the connection member. That is, although the connection member and the nuts are processed to have a smooth surface externally, the surface is formed to have uneven portions because of limits to processing. Accordingly, when the contact portion of the nuts and the connection member is checked microscopically in the state where the nuts are engaged with the positive terminal and the negative terminal, the contact portion is a small area.

The conventional battery module produces low output power because of increased contact resistance at the contact portion of the unit battery, resulting in resistance heat generated at the contact portion. Moreover, the nuts used for fastening may become loose because of external vibration. In this case, the contact portion may have even greater contact resistance, resulting in even more heat generated.

Battery module designers have proposed welding the connection member to the terminals. However, in this case, it is difficult to separate the unit battery from the battery module.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a battery module having low contact resistance.

A battery module according to an exemplary embodiment of the present invention includes a plurality of unit batteries each having a terminal electrically connected to a terminal base and at least one connector including at least one protrusion on a side facing the terminal base of the terminal to electrically couple the terminal of one of the plurality of unit batteries with the terminal of a neighboring one of the plurality of unit batteries.

The at least one protrusion may include at least one first protrusion and at least one second protrusion. The at least one first protrusion contacts the terminal base of the one of the plurality of unit batteries and the at least one second protrusion contacts the terminal base of the neighboring one of the plurality of unit batteries.

The terminal base may include a nut engaging the terminal.

The terminal base may be integrally formed with the terminal.

Each of the plurality of unit batteries may include a casing containing an electrode assembly electrically coupled to the terminal, and a cap plate holding the electrode assembly in the casing. The cap plate has an opening through which a portion of the terminal protrudes.

The at least one protrusion may include at least one ring-shaped protrusion. The at least one protrusion may have a triangle-shaped, arc-shaped or quadrangle-shaped cross-section.

The at least one protrusion may be ring-shaped around the opening of the at least one connector through which a portion of the terminal of one of the plurality of unit batteries protrudes. The at least one protrusion may have a wave-shaped cross-section.

The at least one protrusion may include a plurality of bars each extending outwardly from near the opening in a radial direction.

The at least one protrusion may include a plurality of conical-shaped protrusions around the opening.

The battery module may further include a plurality of cell barriers, each of the plurality of cell barriers between adjacent ones of the plurality of unit batteries to form a passage for a thermal transfer medium.

The battery module may further include a nut fastening one of the at least one connector to the terminal of one of the plurality of unit batteries.

As described above, according to exemplary embodiments of the present invention, the at least one protrusion on the at least one connector is closely adhered to the terminal base. Accordingly, an area where the at least one connector comes into contact with the corresponding terminal may be increased, thereby decreasing contact resistance.

BRIEF DESCRIPTION OF THE DRAWINGS

The accompanying drawings, together with the specification, illustrate exemplary embodiments of the present invention, and, together with the description, serve to explain the principles of the present invention.

DESCRIPTION OF REFERENCE NUMERALS INDICATING PRIMARY ELEMENTS IN THE DRAWINGS

100: battery module
10: unit battery
15: casing
17: cap plate
21, 22: terminal
25, 26: nut
29: terminal base
30: connection member
32: protrusion
36: hole

DETAILED DESCRIPTION OF THE EMBODIMENTS

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "on" another element, it can be directly on the another element or be indirectly on the another element with one or more intervening elements interposed therebetween. Like reference numerals designate like elements throughout the specification.

Figure 1:
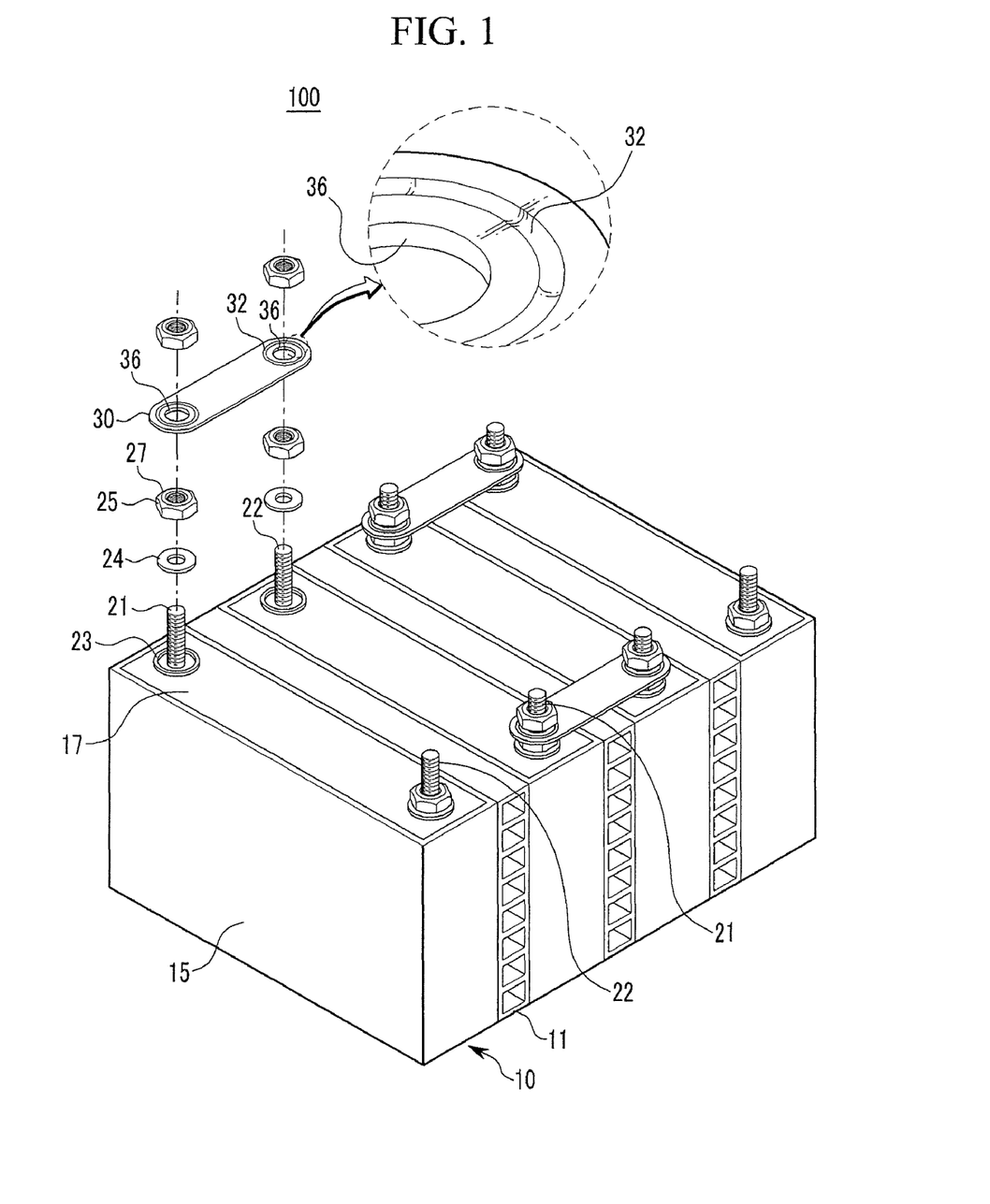
FIG. 1 is an exploded perspective view of a battery module according to a first exemplary embodiment of the present invention.
Figure 2:
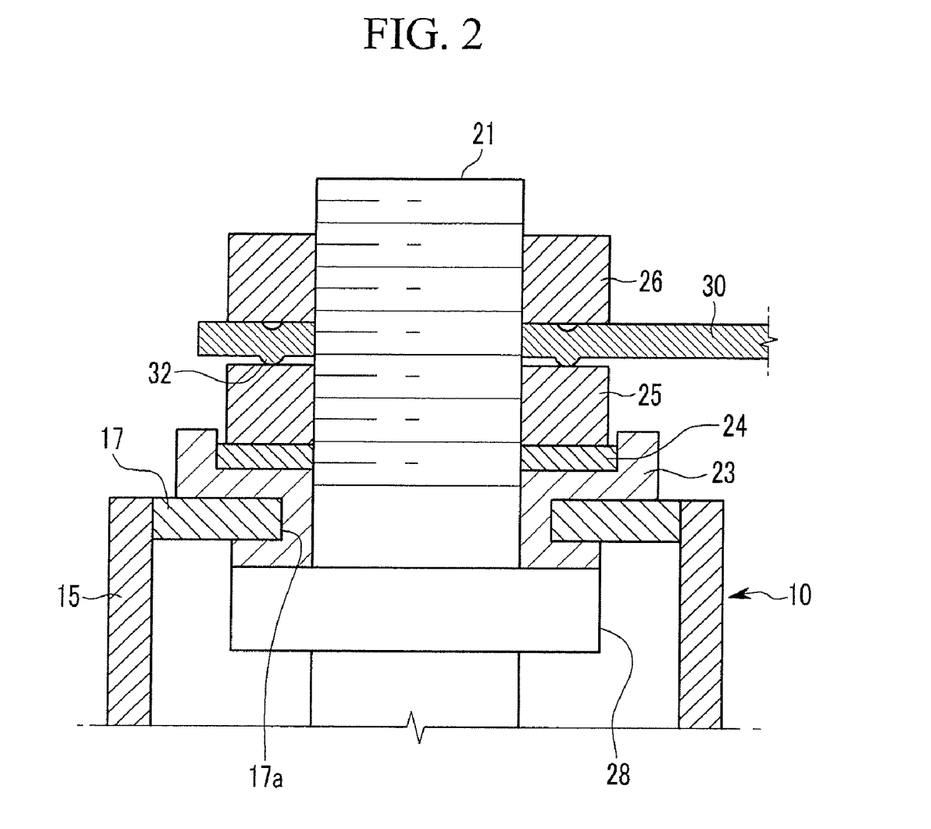
FIG. 2 is a cross-sectional view of a part of the battery module according to the first exemplary embodiment of the present invention shown in FIG. 1.

FIG. 1 is an exploded perspective view of a battery module according to a first exemplary embodiment of the present invention. FIG. 2 is a cross-sectional view of a part of the battery module according to the exemplary embodiment of the present invention shown in FIG. 1.

Referring to FIGS. 1 and 2, the battery module 100 according to the first exemplary embodiment includes a plurality of unit batteries 10 each having a positive terminal 21 and a negative terminal 22, cell barriers 11 each placed between the unit batteries (e.g., adjacent ones of the unit batteries) and configured to form a passage for a thermal transfer medium, connection members 30 (e.g., at least one connector) each configured to electrically connect the terminals 21 and 22 of a neighboring unit battery 10 (the term "terminal" is a concept including both a positive terminal and a negative terminal), and nuts 25 and 26 configured to fasten the connection member 30 to the terminals 21 and 22.

The unit battery 10 according to the present exemplary embodiment includes a casing 15 configured to have a square shape and to contain, close and seal an electrode assembly, and a cap plate 17 configured to accommodate (e.g., hold) the casing 15. In the present exemplary embodiment, although the unit battery is illustrated to be the square-shaped battery, the unit battery is not limited to the square shape, but may have cylindrical or other shapes.

Furthermore, the terminals 21 and 22 are placed in the cap plate 17 so that they protrude outside the cap plate 17. For example, the cap plate 17 has an opening through which a portion of each of the terminals 21 and 22 protrude. Screw threading engaged with the nuts 25 and 26 is formed on the external circumferential surfaces of the terminals 21 and 22 so that the terminals 21 and 22 can be fixed to the cap plate 17 by the nuts 25 and 26. Here, each of the terminals 21 and 22 may have a rod shape.

Further, a gasket 23 for insulating the cap plate 17 and the terminals 21 and 22 is placed between the cap plate 17 and the terminals 21 and 22. For example, the gasket has a first portion at one side of the cap plate 17 and a second portion at another side of the cap plate 17, thereby engaging the cap plate 17.

Holes 17a (e.g., openings) each having a specific diameter are formed in the cap plate 17 in order to install the terminals 21 and 22 and the gasket 23 in the holes 17a. For example, the portion of each of the terminals 21 and 22 protrude through corresponding ones of the holes 17a. The gasket 23 is installed in the state where it is inserted into the hole 17a, so the upper portion of the gasket 23 is placed outside the cap plate 17 and the lower portion of the gasket 23 is placed inside the cap plate 17. A flange unit 28 is formed under the terminals 21 and 22 and is configured to support the terminals 21 and 22 within the cap plate 17.

When the first nut 25 placed on the lower side, which belongs to the nuts 25 and 26, is installed on each of the terminals 21 and 22, a washer 24 may be inserted between the gasket 23 and the first nut 25. In this case, the first nut 25 functions as a base member.

In the present exemplary embodiment, the positive terminal 21 and the negative terminal 22 of each of the unit batteries 10, constituting the battery module 100, are arranged to cross the positive terminal 21 to a negative terminal 22 of a neighboring unit battery 10 so that the unit batteries 10 can be coupled to each other in series. Thus, the connection member 30 is placed in the positive terminal 21 of the unit battery 10 on one side and the negative terminal 22 of the neighboring unit battery 10 on the other side.

The connection member 30 has a long sheet shape. Holes 36 into which the respective terminals 21 and 22 are inserted are formed on both edge portions of the connection member 30 in the length direction. After the first nuts 25 are placed in the terminals 21 and 22, the connection member 30 is installed by inserting the terminals into the respective holes 36. Here, in order to fix the connection member 30, the second nuts 26 are fastened to the respective terminals 21 and 22 over the connection member 30. The second nut 26 functions to pressurize the connection member toward the first nut 25. Accordingly, current generated by the electrode assembly is transferred to the connection member 30 via the positive terminal 21 and the first nut 25.

In this case, protrusions 32 are formed on a surface of the connection member 30, which faces the first nut 25. The protrusions 32 are formed by bending the connection member 30. Accordingly, a portion on a surface of the connection member 30 which faces the second nut 26 and corresponds to the portion, protruding from the connection member 30, is concave. Each of the protrusions 32 is formed in the circumferential direction of each of the terminals 21 and 22. For example, the protrusion 32 has a circular ring shape which surrounds each of the holes 36 into which the respective terminals 21 and 22 are inserted.

The protrusion 32 may have an arc section, but is not limited to the arc shape. For example, the protrusion 32 may have a variety of sectional shapes, such as a triangle (e.g., FIG. 4A) or a quadrangle (e.g., FIG. 4B).

If the protrusions 32 are formed in the connection member 30 as in the present exemplary embodiment, the protrusions 32 are closely adhered to the first nuts 25 (i.e., the base members), thereby forming a current passage. Accordingly, the connection member 30 may come into contact with the first nuts 25 over a wider area.

Figure 3A:
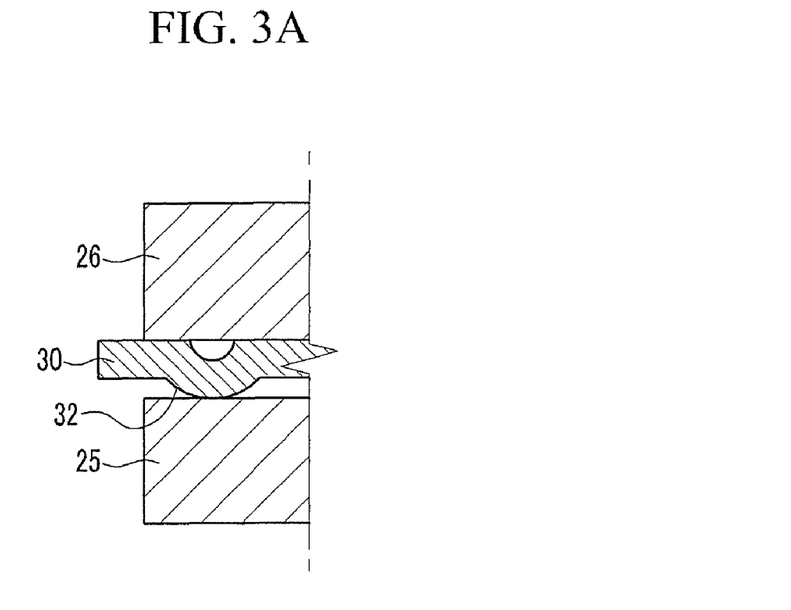
FIG. 3A is a cross-sectional view of a protrusion according to an exemplary embodiment of the present invention.
Figure 3B:
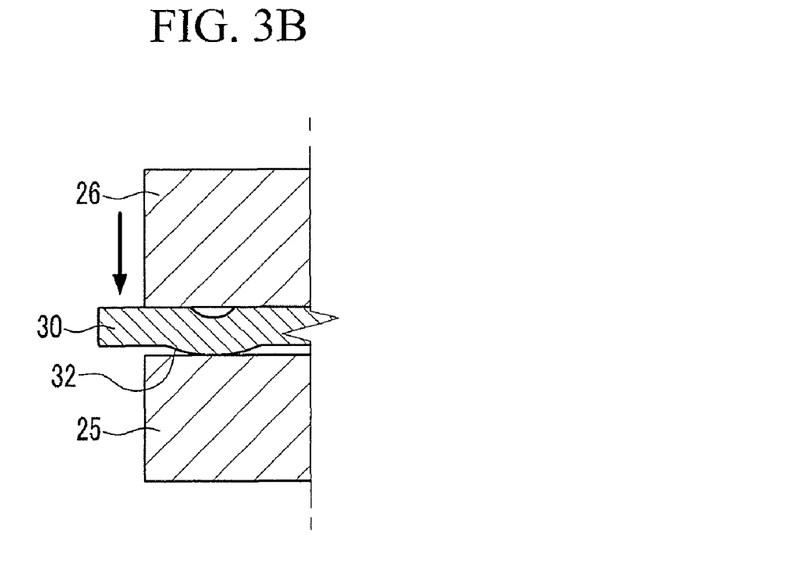
FIG. 3B is a cross-sectional view of the protrusion being deformed by pressurized nuts in accordance with the exemplary embodiment of the present invention shown in FIG. 3A.
Figure 4A:
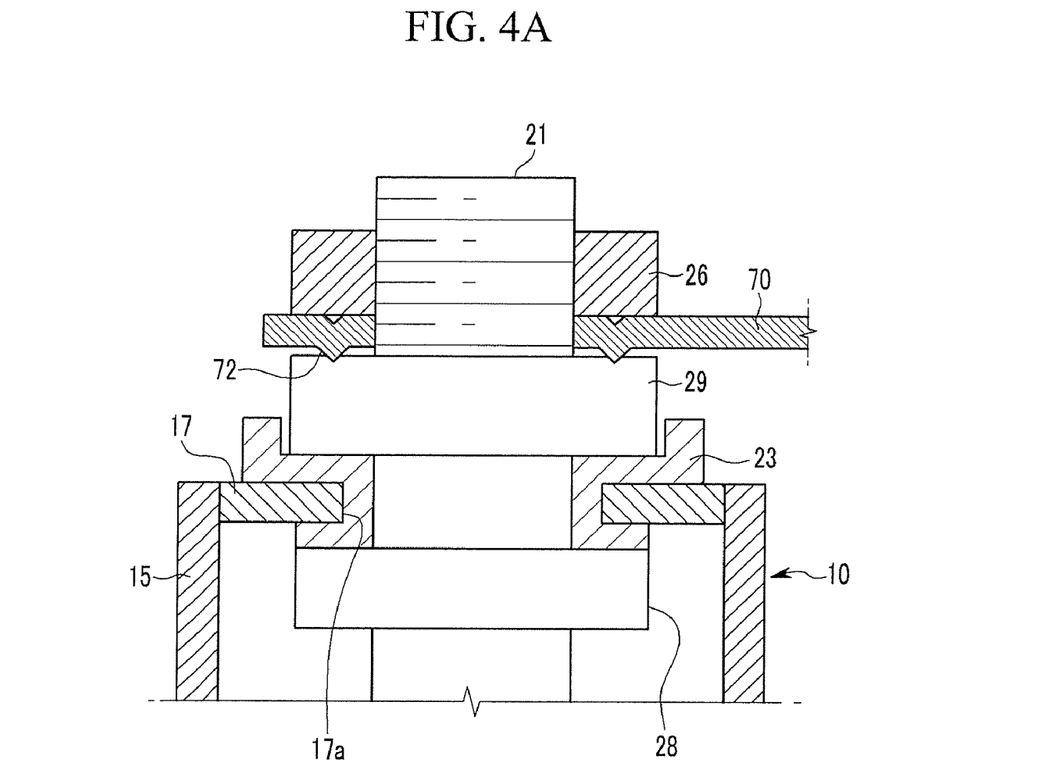
FIG. 4A is a cross-sectional view of a part of a battery module according to a second exemplary embodiment of the present invention.
Figure 4B:
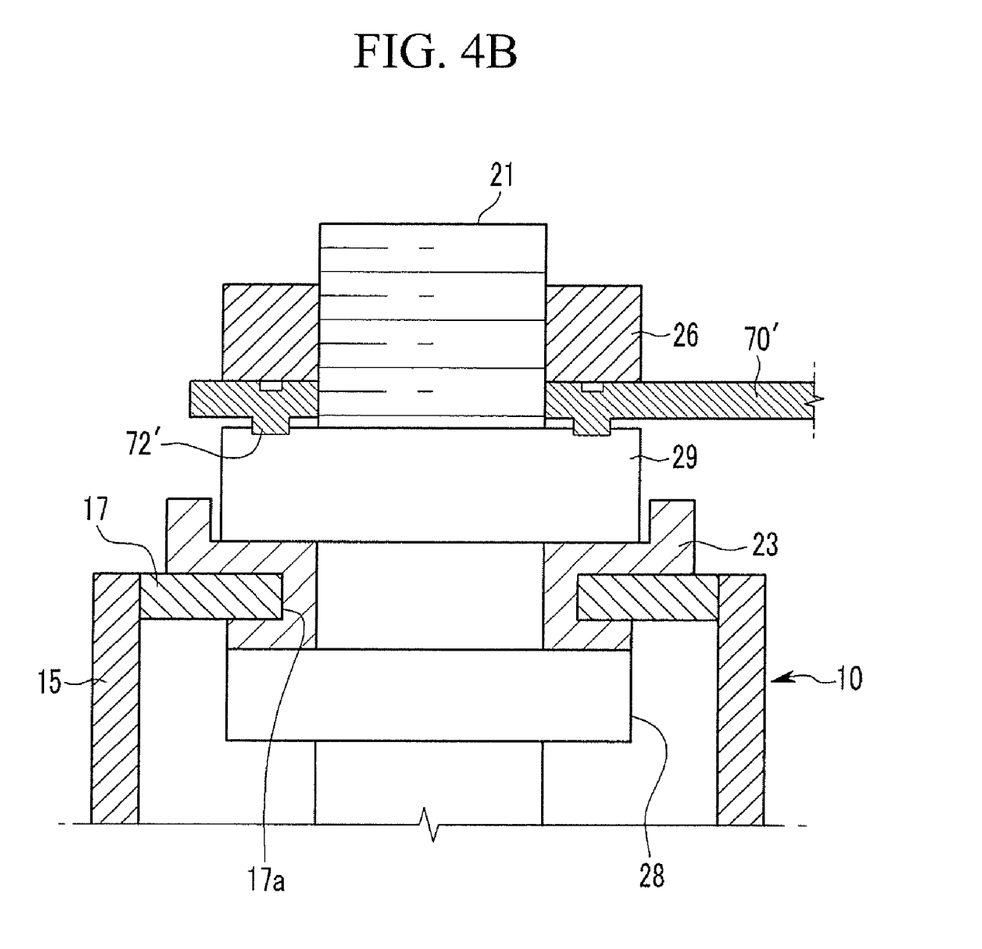
FIG. 4B is a cross-sectional view of a part of a battery module according to a third exemplary embodiment of the present invention.

For example, the connection member 30 is bent to form the protrusion 32. Accordingly, when the protrusion 32 is pressed against the first nut 25 by the second nut 26 (functioning as the pressurization member) as shown in FIGS. 3 and 4, the protrusion 32 is spread out, thereby being capable of elastically deforming the curvature of the protrusion 32 smoothly. Accordingly, the protrusion 32 may come into contact with the first nuts 25 over a wider area.

FIG. 4A is a cross-sectional view of a part of a battery module according to a second exemplary embodiment of the present invention. The battery module according to the present exemplary embodiment has the same construction as the battery module according to the first exemplary embodiment except for terminals and the shape of a connection member, and a description of the same construction is omitted.

A flange unit 28 placed under a cap plate 17 and a terminal base 29 placed over the cap plate 17 are formed in a positive terminal 21 according to the present exemplary embodiment. Although the positive terminal is described as an example for convenience of description, the negative terminal has the same construction as the positive terminal. The flange unit 28 and the terminal base 29 are integrally formed with the positive terminal 21 and are configured to support the positive terminal 21 for the cap plate 17. The flange unit 28 and the terminal base 29 may be formed by extending a section of the positive terminal 21 when the positive terminal 21 is being inserted into the cap plate 17.

When the terminal base 29 is integrally formed with the positive terminal 21 as described above, contact resistance, occurring between the positive terminal 21 and the first nut, may be reduced.

Meanwhile, protrusions 72 are formed in a surface of a connection member 70, which faces the terminal base 29. For example, the protrusions 72 are formed by bending the connection member. Further, each of the protrusions 72 may have a triangle which pointedly protrudes toward the terminal base 29.

When the protrusions 72 are formed as described above, the protrusions 72 may dig into the surface of the terminal base 29 and may be closely adhered thereto. When the protrusions 72 dig into the surface of the terminal base 29 as described above, the protrusions 72 come into surface contact with the terminal base 29. Accordingly, an area where the connection member 70 comes into contact with the terminal base 29 can be increased.

FIG. 4B is a cross-sectional view of a part of a battery module according to a third exemplary embodiment of the present invention. The embodiment of FIG. 4B is similar to embodiments illustrated in FIGS. 1-4A, except that the cross-section is quadrangle-shaped.

Figure 5:
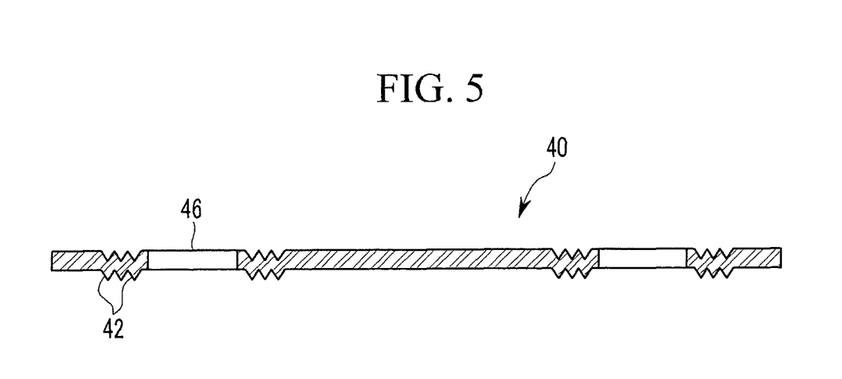
FIG. 5 is a cross-sectional view of a connection member according to a fourth exemplary embodiment of the present invention.

FIG. 5 is a cross-sectional view of a connection member according to a fourth exemplary embodiment of the present invention.

Referring to FIG. 5, the connection member 40 according to the present exemplary embodiment has a sheet shape. Holes 46 into which the respective terminals 21 and 22 are inserted are formed in the connection member 40 in such a way as to adjoin both edges of the connection member 40 in the length direction thereof.

Protrusions 42 are further formed around each of the holes 46. The protrusions 42 have a structure in which a plurality of protrusions and depressions is consecutive to each other. Accordingly, the protrusions 42 have a waveform section. Further, the protrusions 42 are arranged along the circumference of each of the holes 46, so the plurality of ring-shaped protrusions 42 is arranged around each of the holes 46 in the connection member 40.

When the plurality of protrusions 42 is arranged around each of the holes 46 as described above, a larger number of the protrusions 42 may come into contact with the nuts or the base members (i.e., the terminal bases), thereby being capable of reducing contact resistance.

Figure 6:
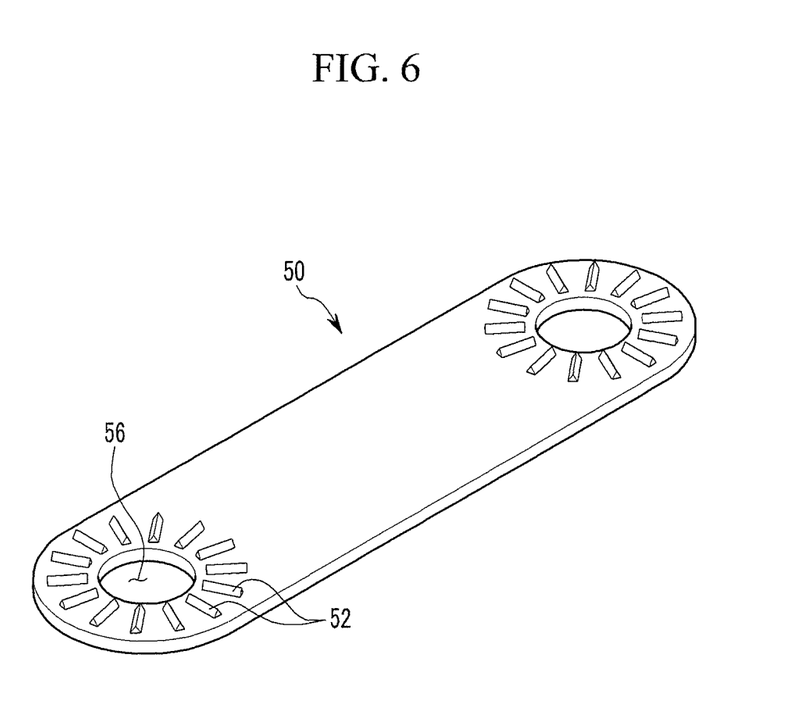
FIG. 6 is a perspective view of a connection member according to a fifth exemplary embodiment of the present invention.

FIG. 6 is a perspective view of a connection member according to a fifth exemplary embodiment of the present invention.

Referring to FIG. 6, a connection member 50 according to the fifth exemplary embodiment has a sheet shape. Holes 56 into which the respective terminals 21 and 22 are inserted are formed in the connection member 50 in such a way as to adjoin both edges of the connection member 50 in the length direction thereof.

A plurality of protrusions 52 is formed on the circumference of (e.g., about) each of the holes 56. The protrusions 52 are configured to protrude from a surface of the connection member 50 and are respectively formed to extend in a radial direction from each of the holes 56. Further, the protrusions 52 are spaced apart from each other at constant intervals and are arranged in the circumferential direction of each of the holes 56. When the protrusions 52 are arranged as described above, the protrusions 52 uniformly come into contact with the nuts or the terminal base (i.e., the base member) not only in the circumferential direction, but also the radius direction. Accordingly, current can be transferred through the protrusions 52 more stably.

In general, current tends to flow along the shortest path. If the protrusions extend only in the circumferential direction and the shortest path is one of portions of the circumferences, the current may be concentrated on the corresponding portion. Accordingly, resistance may increase and heat may occur in the corresponding portion.

When the protrusions 52 extend in the radial direction and the plurality of protrusions 52 is spaced apart from each other along the circumference as in the present exemplary embodiment, however, sufficient contact may be achieved not only in the circumferential direction, but also in the length direction. Accordingly, the concentration of current can be prevented.

Figure 7:
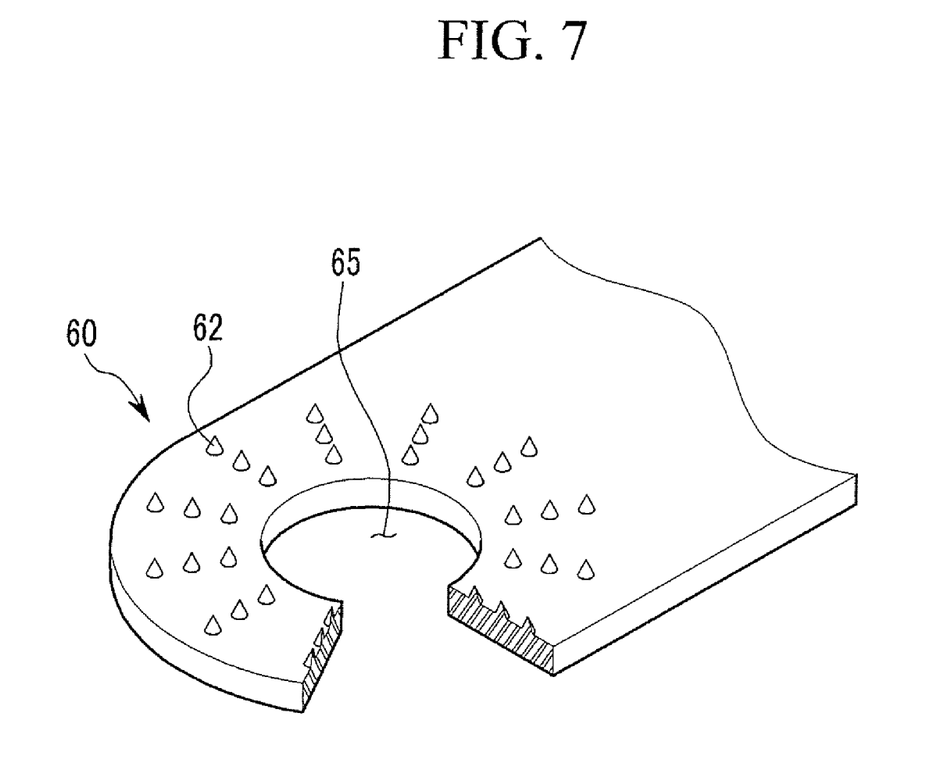
FIG. 7 is a partially cut-away perspective view of a connection member according to a sixth exemplary embodiment of the present invention.

FIG. 7 is a partially cut-away perspective view of a connection member according to a sixth exemplary embodiment of the present invention.

Referring to FIG. 7, the connection member 60 according to the sixth exemplary embodiment has a sheet shape, and holes into which the respective terminals 21 and 22 are inserted are formed in the connection member 60. Protrusions 62 are formed in the connection member 60. Each of the protrusions 62 may have a conical shape, and plural sets of the protrusions 62 are spaced apart from each other around each of the holes 65.

In the present exemplary embodiment, the plurality of protrusions is radially arranged from near each of the holes 65 to the outside of the hole (e.g., extending outwardly from near the opening in a radial direction). However, the present invention is not limited to the above embodiment, and the protrusions 62 may be arranged in various forms.

When each of the protrusions 62 has a conical shape, the edges of the conical shapes dig into the nuts or the terminal bases (i.e., the base members). Accordingly, the protrusions 62 may contact the base members more stably.

That is, each of the protrusions 62 may have a different height depending on clearance. When the connection member 60 is pressed against the base members by pressurization members such as the nuts, the protrusions 62 having a great height may dig deep into the base members and the protrusions 62 having a small height may dig into the base members less than the protrusions 62 having a great height because the edges of the protrusions 62 are pointed. Accordingly, all the protrusions 62 may come into contact with the base members. Consequently, the connection member 60 and the terminals 21 and 22 may come into contact with each other stably.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module comprising:
   a plurality of unit batteries, each of the unit batteries having a terminal electrically coupled to a terminal base; and
   at least one connector comprising substantially flat first surface facing the terminal base of the terminal of at least one of the plurality of unit batteries and a substantially flat second surface opposite the first surface;
   wherein a bent portion of the at least one connector comprises at least one protrusion on the first surface to electrically couple the terminal of the one of the plurality of unit batteries with the terminal of a neighboring one of the plurality of unit batteries, and at least one concave portion on the second surface and positioned corresponding to the at least one protrusion.

2. The battery module of claim 1, wherein the at least one protrusion comprises at least one first protrusion and at least one second protrusion, and the at least one first protrusion contacts the terminal base of the one of the plurality of unit batteries and the at least one second protrusion contacts the terminal base of the neighboring one of the plurality of unit batteries.

3. The battery module of claim 1, wherein at least a portion of the at least one protrusion digs into the terminal base of the at least one of the plurality of unit batteries.

4. The battery module of claim 1, wherein the terminal base comprises a nut engaging the terminal.

5. The battery module of claim 1, wherein the terminal base is integrally formed with the terminal.

6. The battery module of claim 1, further comprising:
   a plurality of cell barriers, each of the plurality of cell barriers between adjacent ones of the plurality of unit batteries to form a passage for a thermal transfer medium.

7. The battery module of claim 1, further comprising:
   a nut fastening the at least one connector to the terminal of the one of the plurality of unit batteries.

8. A hybrid electric vehicle or an electric vehicle comprising the battery module of claim 1.

9. The battery module of claim 1, wherein the at least one protrusion comprises
   a plurality of protrusions configured to contact the terminal base of the terminal of the one of the plurality of unit batteries,
   wherein at least two adjacent ones of the plurality of protrusions are spaced apart from one another, with at least a portion of the substantially flat first surface therebetween.

10. The battery module of claim 1, wherein each of the plurality of unit batteries comprises a casing containing an electrode assembly electrically coupled to the terminal, and a cap plate holding the electrode assembly in the casing, wherein the cap plate has an opening through which a portion of the terminal protrudes.

11. The battery module of claim 10, further comprising:
   a flange under the cap plate, wherein the flange is integrally formed with the terminal.

12. The battery module of claim 11, further comprising a gasket mounted on the cap plate at the opening and having a first portion at one side of the cap plate and a second portion at another side of the cap plate, thereby engaging the cap plate.

13. The battery module of claim 10, wherein the at least one connector has an opening through which the portion of the terminal of the one of the plurality of unit batteries protrudes, wherein the at least one protrusion is around the opening.

14. The battery module of claim 13, wherein the at least one protrusion comprises at least one ring-shaped protrusion around the opening.

15. The battery module of claim 13, wherein the at least one protrusion has a triangle-shaped, arc-shaped or quadrangle-shaped cross-section.

16. The battery module of claim 13, wherein the at least one protrusion is ring-shaped around the opening, and has a wave-shaped cross-section.

17. The battery module of claim 13, wherein the at least one protrusion comprises a plurality of bars each extending outwardly from near the opening in a radial direction.

18. The battery module of claim 13, wherein the at least one protrusion comprises a plurality of conical-shaped protrusions around the opening.

* * * * *

UNITED STATES PATENT AND TRADEMARK OFFICE
CERTIFICATE OF CORRECTION

| | |
|---|---|
| PATENT NO. | : 7,972,185 B2 |
| APPLICATION NO. | : 12/625519 |
| DATED | : July 5, 2011 |
| INVENTOR(S) | : Yong-Sam Kim |

It is certified that error appears in the above-identified patent and that said Letters Patent is hereby corrected as shown below:

In the Claims

Column 7, Claim 1, line 57.    After "comprising"

Insert -- a --

Signed and Sealed this
Twenty-second Day of May, 2012

David J. Kappos
*Director of the United States Patent and Trademark Office*